United States Patent
Endo

(10) Patent No.: US 7,025,798 B2
(45) Date of Patent: Apr. 11, 2006

(54) TABLETOP-TYPE AIR CLEANER

(75) Inventor: Kiyomu Endo, Tokyo (JP)

(73) Assignee: O-DEN Corporation, Tokyo (JP)

( * ) Notice: Subject to any disclaimer, the term of this patent is extended or adjusted under 35 U.S.C. 154(b) by 97 days.

(21) Appl. No.: 10/633,635

(22) Filed: Aug. 5, 2003

(65) Prior Publication Data
US 2004/0025697 A1 Feb. 12, 2004

(30) Foreign Application Priority Data
Aug. 7, 2002 (JP) ............................ 2002-230668

(51) Int. Cl.
*B01D 46/00* (2006.01)
*B01D 50/00* (2006.01)

(52) U.S. Cl. .................... 55/385.1; 55/413; 55/415; 55/416; 55/467; 55/471; 55/473; 55/482; 55/484; 55/498; 55/521; 55/524; 55/527; 96/55; 96/66; 96/68; 96/154; 96/222; 96/397; 96/399; 96/417; 96/423

(58) Field of Classification Search ............... 55/385.1, 55/413, 414, 415, 416, 467, 471, 472, 473, 55/482, 484, 495, 498, 500, 501, 521, 524, 55/DIG. 34, DIG. 37, 527; 96/55, 57, 58, 96/66, 67, 68, 69, 74, 98, 154, 222, 397, 96/399, 417, 423; 454/358
See application file for complete search history.

(56) References Cited

U.S. PATENT DOCUMENTS 3,747,300 A * 7/1973 Knudson ................... 96/58
4,043,776 A * 8/1977 Orel ....................... 55/472
4,370,155 A * 1/1983 Armbruster ............... 55/472
4,729,293 A * 3/1988 Tsunoda et al. ........... 454/313
4,743,737 A * 5/1988 Tateishi .................... 454/285
5,591,242 A * 1/1997 Kuo ......................... 55/472
5,601,636 A * 2/1997 Glucksman ............... 55/471

(Continued)

FOREIGN PATENT DOCUMENTS

JP 11-309320 11/1999

(Continued)

OTHER PUBLICATIONS

South Korea Office Action dated May 30, 2005 with a partial English translation.

*Primary Examiner*—Jason M. Greene
(74) *Attorney, Agent, or Firm*—McGinn IP Law Group, PLLC

(57) ABSTRACT

A personal tabletop-type air cleaner is provided which is user-friendly and can improve smoke sucking efficiency in a simple configuration. The disclosed personal tabletop-type air cleaner has a front opening portion to suck air containing smoke of a cigarette, a blower to forcedly feed air having been sucked into the front opening portions in a centrifugal manner, a pair of right and left peripheral opening portions each being placed in a fringe portion on the right and the left at a front of the air cleaner and forming an air curtain by emitting air fed forcedly from the blower ahead of the front of the air cleaner, a dust collecting filter being placed between the front opening portion and the blower to remove cigarette odor, and a deodorizing filter being placed between the blower and each peripheral opening portion making up the pair of right and left peripheral opening portions to remove cigarette odor.

15 Claims, 6 Drawing Sheets

U.S. PATENT DOCUMENTS

| | | | |
|---|---|---|---|
| 6,156,088 A * | 12/2000 | Cardarelli | 55/471 |
| 6,328,791 B1 * | 12/2001 | Pillion et al. | 55/471 |
| 6,361,590 B1 * | 3/2002 | Gilbert et al. | 55/472 |
| 2004/0118093 A1 * | 6/2004 | Chang et al. | 55/471 |
| 2004/0144249 A1 * | 7/2004 | Kang et al. | 55/472 |
| 2004/0182244 A1 * | 9/2004 | Wu et al. | 55/472 |

FOREIGN PATENT DOCUMENTS

| | | |
|---|---|---|
| JP | 3092112 | 7/2000 |
| JP | 2001-317771 | * 11/2001 |
| WO | WO 00/06288 | 0/2000 |
| WO | WO 99/50603 | 10/1999 |

* cited by examiner

*PRIOR ART*

TABLETOP-TYPE AIR CLEANER

BACKGROUND OF THE INVENTION

1. Field of the Invention

The present invention relates to a personal tabletop-type air cleaner to remove smoke of a cigarette, that can be placed on a desk, table, or a like.

The present application claims priority of Japanese Patent Application No. 2002-230668 filed on Aug. 7, 2002, which is hereby incorporated by reference.

2. Description of the Related Art

Conventionally, in an air cleaner of this type, as shown in FIG. 10, a suction port 1 of smoke is placed at a front 1A of the air cleaner and a blow-off port 2 of cleaned air is placed at a rear 2A of the air cleaner. It has configurations of an air flow passage which, figuratively speaking, are reverse to those of a fan. However, the conventional air cleaner has a problem. That is, when such the conventional air cleaner is put at a place being near to a wall or fittings at the rear 2A of the air cleaner, since its blow-off port 2 placed at the rear 2A of the air cleaner is blocked, very poor usability is provided.

To solve such the problem as above, an air cleaner is disclosed, for example, in Japanese Patent No. 3092112 which has been obtained by the applicant of the present invention. In the air cleaner disclosed in this patent, as shown in FIG. 11, only at a front 3A of the air cleaner is placed an opening portion 3 and on an inside of the opening portion 3 are placed an intra-device suction port $3_i$ to suck cigarette smoke and a plurality of intra-device blow-off ports $3_o$, $3_o$, . . . to blow off cleaned air. More particularly, the intra-device suction port $3_i$ is placed directly on an inside of the opening portion 3 in a manner that a central axis of the intra-device suction port $3_i$ approximately conforms to that of the opening portion 3. On the other hand, the intra-device blow-off ports $3_o$, $3_o$, . . . are placed discretely at four places in a manner that a normal to a blow-off surface of each of the intra-device blow-off ports $3_o$, $3_o$, . . . is approximately orthogonal to a normal to an opening surface of the opening portion 3 at its four corners being positioned directly on an inside of a fringe of the opening portion 3. By configuring as above, since a vortex flow of cleaned air is blown from the intra-device blow-off ports $3_o$, $3_o$, . . . around cigarette smoke that is being sucked into the intra-device suction port $3_i$, dispersion of the cigarette smoke is suppressed and, as a result, improvement in smoke sucking efficiency is expected.

However, has turned out that complete formation of a vortex flow is, in actual fact, not easy and its cost is high. In other words, it is not easy to obtain such a stable vortex flow as desired by employing an air cleaner having a simple configuration, there is potentially a fear that an air flow that would impair suction of cigarette smoke occurs. A descending flow being produced by crumbling of the vortex flow and impinging on a desk, in particular, presents a problem since it causes documents on tables to wiggle and it is offensive to users.

SUMMARY OF THE INVENTION

In view of the above, it is an object of the present invention to provide a personal tabletop-type air cleaner which is user friendly and improves smoke sucking efficiency in a simple configuration.

According to a first aspect of the present invention, there is provided a tabletop-type air cleaner including:

a front opening portion to suck air containing smoke of a cigarette, the front opening portion being placed at a front of the air cleaner;

a blower to forcedly feed the air having been sucked from the front opening portion in a centrifugal direction;

a pair of right and left peripheral opening portions to emit air fed forcedly from the blower ahead of the air cleaner, the pair of peripheral opening portions being placed in a fringe portion on the right and the left at the front of the air cleaner; and a porous or fibrous dust collecting filter being placed between the front opening portion and the blower and/or between the blower and each of the peripheral opening portions making up the pair of right and left peripheral opening portions to remove the smoke of the cigarette.

In the foregoing, a preferable mode is one wherein deodorizing filters each being placed between the front opening portion and the blower and/or between the blower and each of the peripheral opening portions making up the pair of right and left peripheral opening portions are mounted.

A preferable mode is one wherein the blower is a centrifugal-type blower having a blade wheel in which a plurality of blades is arranged in a ring-like form and being mounted in a manner that a central axis of the blade wheel approximately conforms to a central axis of the front opening portion, in which the blower, while being operated, captures air from a direction of the central axis of the blade wheel, provides the captured air with turn-around flows, and forcedly feeds, by using generated centrifugal force, air that turns around, from clearances among the blades toward a direction of a portion surrounding the blade wheel.

Also, a preferable mode is one wherein, between the front opening portion and the blower is placed a panel-shaped dust collecting filter which is operated in a form of a panel being folded up in a corrugated form.

Also, a preferable mode is one wherein a ring-shaped dust collecting filter is placed between the blower and each of the peripheral opening portions making up the pair of right and left peripheral opening portions and on a side of the portions surrounding the blade wheel in such a manner that a central axis of the dust collecting filter conforms to the central axis of the blade wheel.

Also, a preferable mode is one wherein a ring-shaped deodorizing filter is placed between the blower and each of the peripheral opening portions making up the pair of right and left peripheral opening portions and on the side of the portions surrounding the blade wheel in a manner that a central axis of the deodorizing filter conforms to the central axis of the blade wheel.

Also, a preferable mode is one wherein the air fed forcedly from the blower is emitted toward an obliquely-forward direction of the air cleaner from the pair of right and left peripheral opening portions in a manner that the air is separated right and left.

Also, a preferable mode is one wherein each of the peripheral opening portions making up the pair of right and left peripheral opening portions is placed at a corner between a front and a side of the air cleaner.

Also, a preferable mode is one wherein each of the peripheral opening portions is formed so as to be approximately longitudinally long along a fringe of a front of the air cleaner.

Also, a preferable mode is one wherein the pair of right and left peripheral opening portions is arranged 25 cm or more and within 40 cm apart from each other in a horizontal direction.

Also, a preferable mode is one wherein each of the peripheral opening portions has a plurality of partitioning plates or blade plates which give a directional property to the air being emitted.

Also, a preferable mode is one wherein the partitioning walls or the blade plates are attached so as to be rotatable so that a direction of the air being emitted is changed.

Also, a preferable mode is one wherein an air-flow direction control circuit is mounted which is used to electrically control rotation of the partitioning plates or the wheel plates.

Also, a preferable mode is one wherein an electrically-controlled dust collecting unit is mounted which is used to electrostatically collect dust by corona charging fine particles floating in the air.

With the above configurations, since an air curtain containing emitted air flows is formed on both sides of flows of cigarette smoke, cigarette smoke is retracted into the air cleaner without excessive dispersion of the cigarette smoke into surroundings. As a result, smoke sucking efficiency can be improved in a manner to be friendly to a human and in simple configuration.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
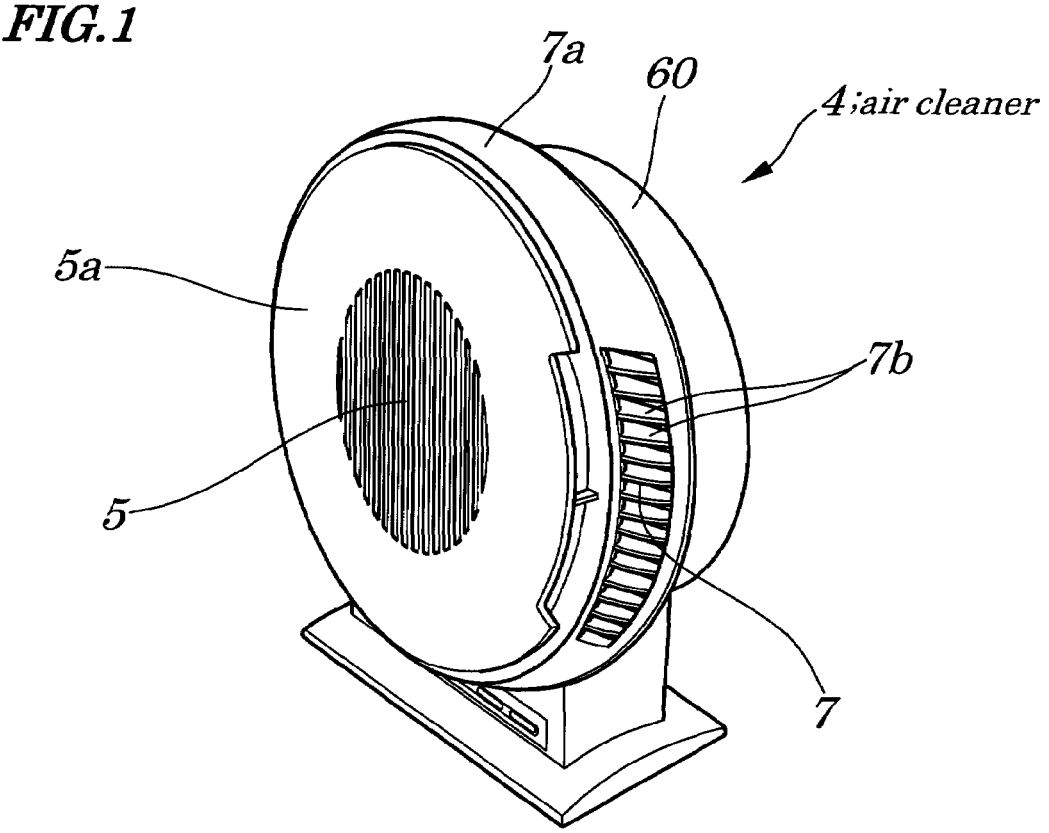
FIG. 1 is a perspective view schematically illustrating an appearance of configurations of a personal use tabletop-type air cleaner according to a first embodiment of the present invention.
Figure 2:
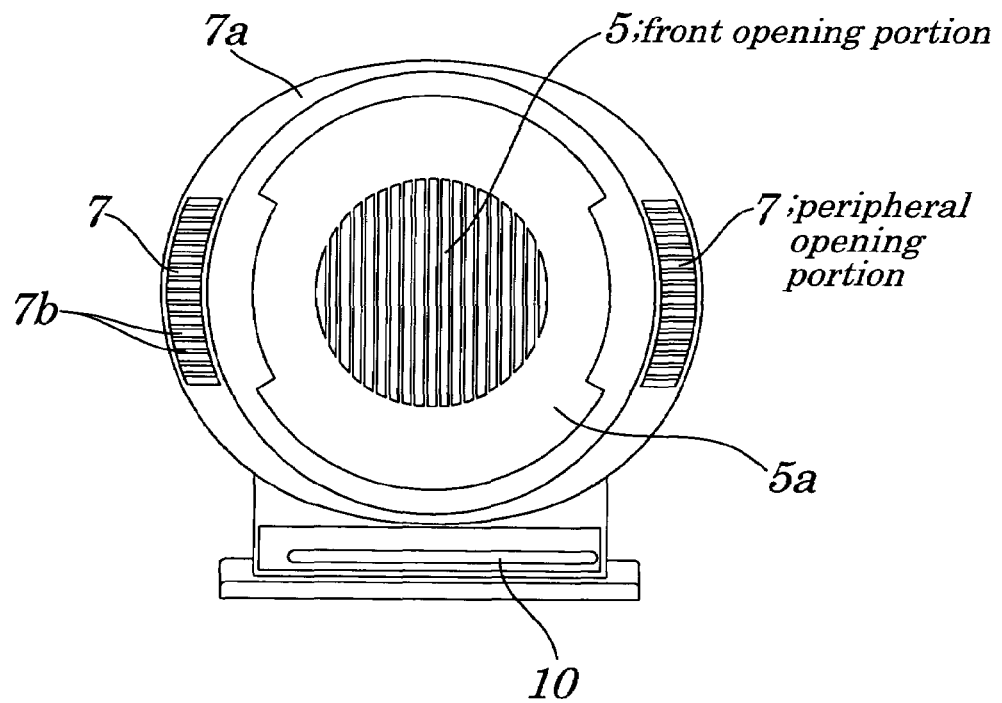
FIG. 2 is a front view schematically illustrating the appearance of configurations of the personal use tabletop-type air cleaner of FIG. 1.
Figure 3:
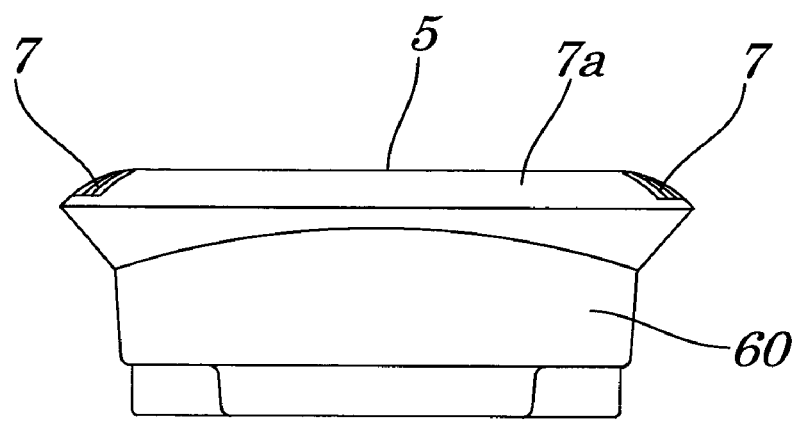
FIG. 3 is a top view schematically illustrating the appearance of configurations of the personal use tabletop-type air cleaner of FIG. 1.
Figure 4:
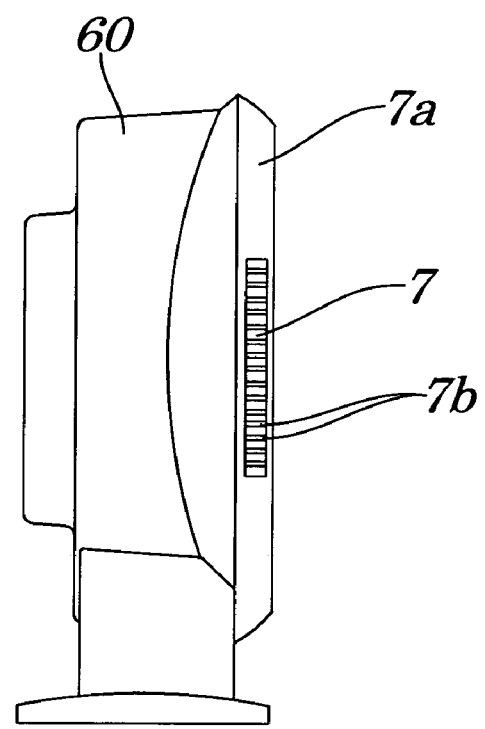
FIG. 4 is a side view schematically illustrating the appearance of configurations of the personal use tabletop-type air cleaner of FIG. 1.
Figure 5:
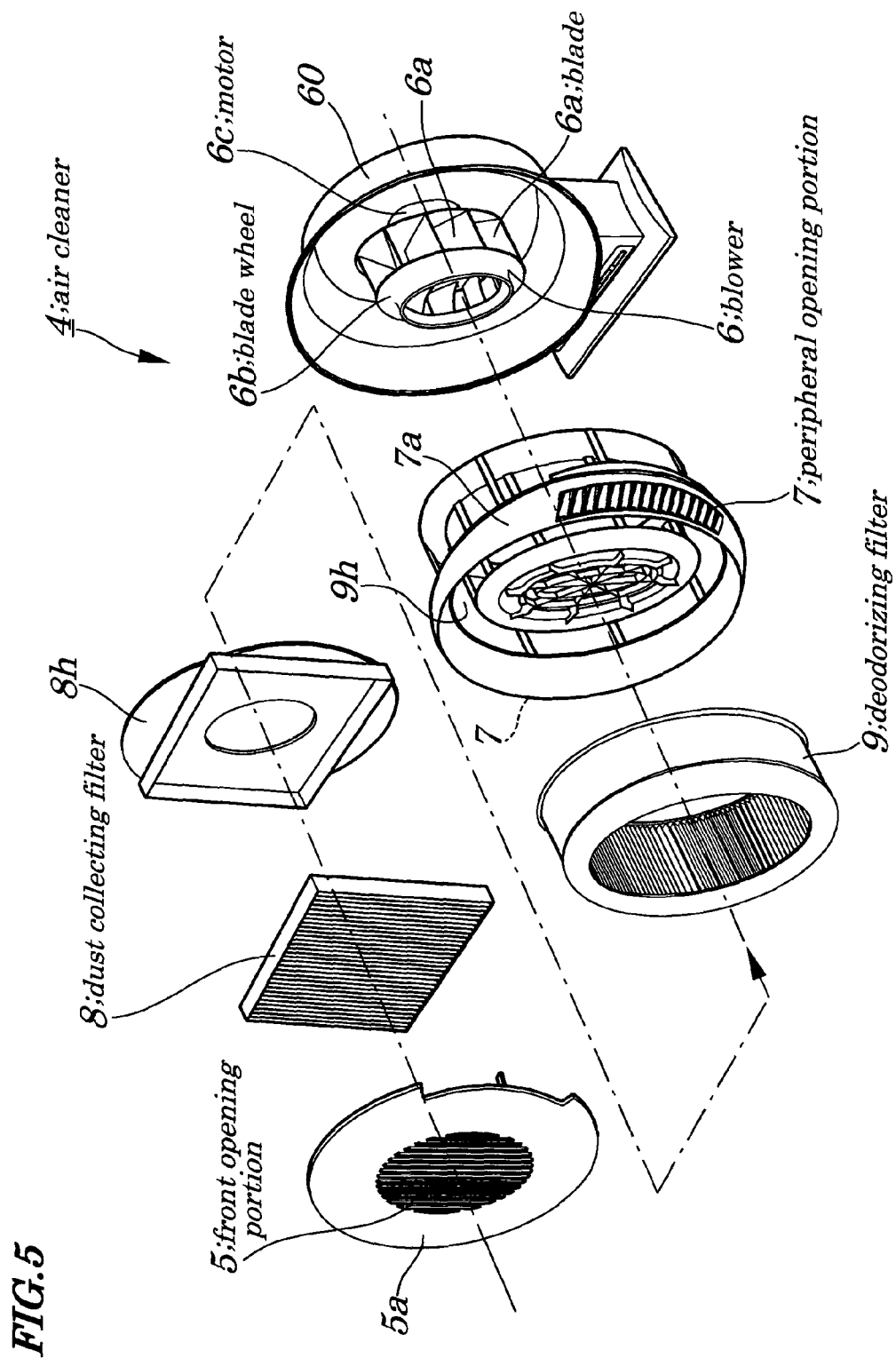
FIG. 5 is an exploded perspective view illustrating configurations of the personal use tabletop-type air cleaner of FIG. 1.
Figure 6:
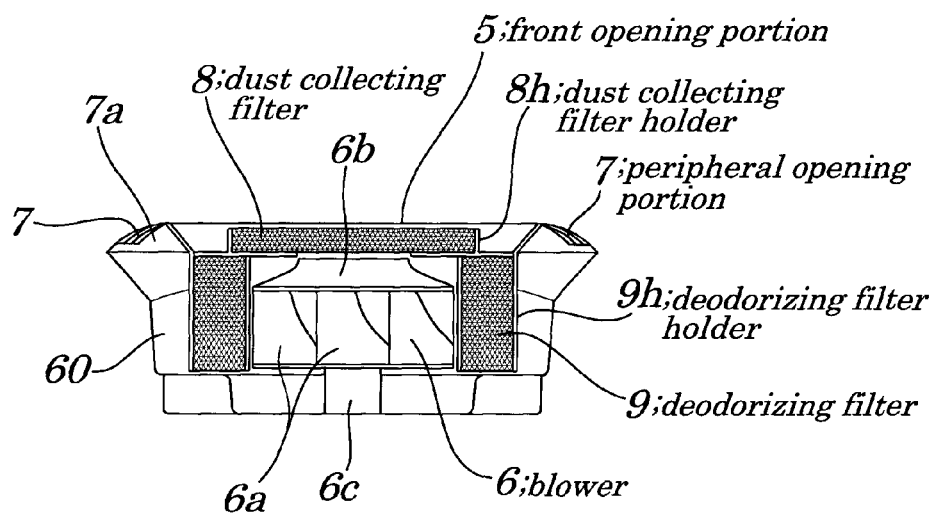
FIG. 6 is a cross-sectional view schematically illustrating an internal configuration of the personal use tabletop-type air cleaner of FIG. 1.
Figure 7:
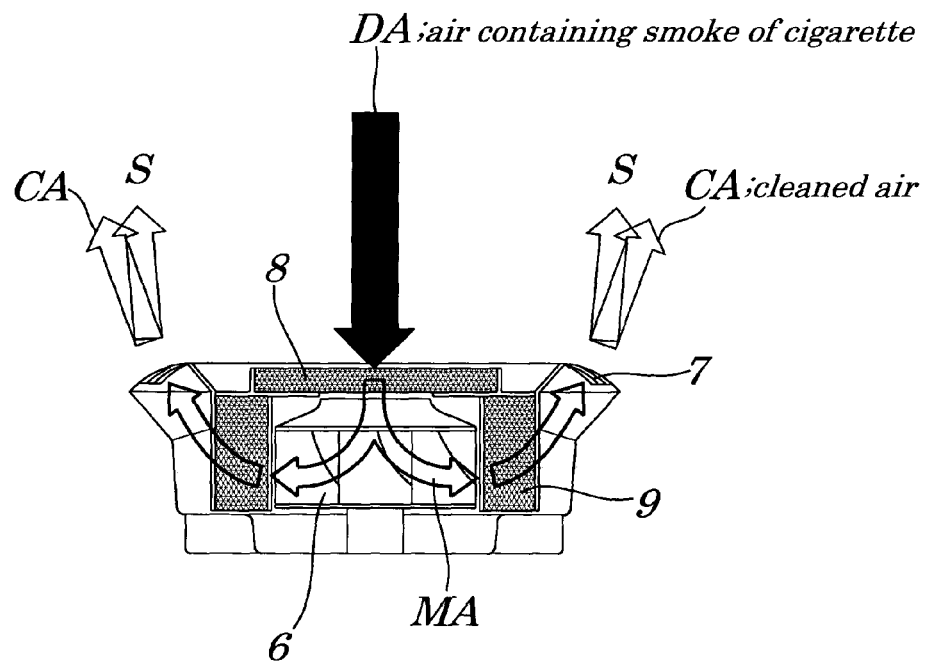
FIG. 7 is a diagram explaining operations of the personal use tabletop-type air cleaner of FIG. 1.

FIG. 1 is a perspective view schematically illustrating an appearance of configurations of a personal use tabletop-type air cleaner according to a first embodiment of the present invention. FIG. 2 is a front view schematically illustrating the appearance of configurations of the personal use tabletop-type air cleaner of FIG. 1. FIG. 3 is a top view schematically illustrating the appearance of configurations of the personal use tabletop-type air cleaner of FIG. 1. FIG. 4 is a side view schematically illustrating the appearance of configurations of the personal use tabletop-type air cleaner of FIG. 1. FIG. 5 is an exploded perspective view illustrating configurations of the personal use tabletop-type air cleaner of FIG. 1. FIG. 6 is a cross-sectional view schematically illustrating an internal configuration of the personal use tabletop-type air cleaner of FIG. 1. FIG. 7 is a diagram explaining operations of the personal use tabletop-type air cleaner of FIG. 1.

First, an entire configuration of the tabletop-type air cleaner is described. The tabletop-type air cleaner 4, as shown in FIG. 1 to FIG. 6, has a front opening portion 5 being placed at a front of the air cleaner 4 and operating to suck air containing cigarette smoke, a blower 6 to forcedly feed air having been sucked (inhaled) from the front opening portion 5 in a centrifugal direction, a pair of peripheral opening portions 7 each being placed on the right and the left in a fringe portion of the air cleaner 4 to blow off air that was fed forcedly from the blower 6, a dust collecting filter 8 being placed between the front opening portion 5 and the blower 6, a deodorizing filter 9 to remove cigarette smoke, the deodorizing filter 9 being sandwiched between the blower 6 and each of peripheral opening portions 7, and an operation panel portion 10 to perform an ON/OFF operation of the power source and to adjust an amount of an air flow.

Next, each of components of the air cleaner 4 is described. The front opening portion 5 is formed to be stripe-shaped and to be circular as a whole within a front panel 5a having an approximately circular shape. Moreover, the blower 6 is a turbo blower made up of a blade wheel 6b having a plurality of blades 6a, 6a, . . . being arranged in a ring-like form and a motor 6c to drive the blade wheel 6b and being mounted on an approximately circular main body 60 in a manner that a central axis of the blade wheel 6b and the motor 6c approximately conforms to that of the front opening portion 5. An approximately circular device box body is made up of the main body 60 and the front panel 5a.

Moreover, in a ring-like portion serving as a corner portion between a front and a side of the air cleaner 4 is placed a front peripheral portion cover 7a and in right and left portions of the front peripheral portion cover 7a is formed the above-described peripheral opening portions 7 each being approximately longitudinally long so that an air curtain can be formed by blowing air outside from each of the peripheral opening portions 7 in right and left portions of the front peripheral portion cover 7a. Additionally, in the embodiment, the air cleaner 4 is so constructed that the pair of the peripheral opening portions 7 each being placed on the right and the left blows off air fed forcedly from the blower 6 toward an obliquely forward side in a manner that the air is separated right and left therein. Moreover, in each of the right and left peripheral opening portions 7, a plurality of blade plates (partitioning plates) 7b, 7b, . . . used to control a directional property of a flow of air being blown off is arranged at a specified distance in a horizontal grid form. Here, the right and left peripheral opening portions 7 are arranged 25 cm or more and within 40 cm apart from each other in a horizontal direction. This distance is determined by taking into consideration a horizontal width of a body of an adult human.

Moreover, the dust collecting filter 8 described above is so configured that a panel-like portion is formed which is constructed by folding up a sheet member, made of a porous or fibrous material that can catch and separate cigarette smoke, in a corrugated form and is held by a dust collecting filter holder 8h. The dust collecting filter 8 of the embodiment, when its life for dust collection is over, can be replaced. The deodorizing filter 9 is so configured as to be a ring-like body having a double structure made up of fine powdery activated carbon and granular activated carbon and to be placed on a side of outer portions surrounding the blade wheel 6b in a manner that a central axis of the deodorizing filter 9 conforms to a central axis of the blade wheel 6b and that the deodorizing filter 9 is held by a deodorizing filter holder 9h. The deodorizing filter holder 9h is formed integrally with the front peripheral portion cover 7a and at its front is placed a plurality of concave portions (not shown) used to hold the dust filter holder 8h for positioning. The deodorizing filter holder 9h and the front peripheral portion cover 7a, both having been formed integrally, are so constructed as to be attached to the main body 60 which provides an appearance of a rear side of the tabletop-type air cleaner 4 in a manner to be detachable/attachable. The deodorizing filter holder 9h, when its life as a deodorizer is over, can be also replaced.

Next, operations of the tabletop-type air cleaner 4 having configurations described above are explained by referring to FIG. 7. While a user takes a smoke, when a switch of the tabletop-type air cleaner 4 is turned ON, operations of the blower 6 are started. While the blower 6 is in an operated state, when smoke is emitted aiming at a front of the tabletop-type air cleaner 4 (placed 30 cm to 60 cm before the smoker), air DA containing cigarette smoke is sucked from the front opening portion 5. Then, the sucked air DA passes through the dust collecting filter 8 and, at this point, cigarette smoke is caught and removed by the dust collecting filter 8. Therefore, air having passed through the dust collecting filter 8 and having reached inner portions surrounding the blade wheel 6b is clean air MA from which cigarette smoke has been removed. However, odor molecules of a cigarette cannot be completely removed and some odor molecules of the cigarette odor still remain therein.

Next, the air MA turns around by being pressed by each of the blades 6a of the blade wheel 6b and is fed forcedly by centrifugal force occurred then through clearances among the blades 6a toward a direction of a fringe of the blade wheel 6b. On a side of a portion surrounding the blade wheel 6b, the deodorizing filter 9 is placed that surrounds the blade wheel 6b concentrically. Therefore, the air MA being fed forcedly toward the direction of the fringe of the blade wheel 6b passes through the deodorizing filter 9 and, at the time of the passage, residual odor molecules having turn-around flows is adsorbed and removed by the deodorizing filter 9. Air CA having been further cleaned by the deodorizing filter 9, as shown in FIG. 7, is emitted from the right and left peripheral opening portions 7 toward a direction of a front of the air cleaner 4 (in the embodiment, to obliquely-forward directions S, S of the air cleaner 4 in a manner that the air is separated right and left). In the embodiment, since a distance between a smoker and the tabletop-type air cleaner 4 is set within a range of 30 cm to 60 cm and since a distance between the right and left peripheral opening portions 7 is set to be 25 cm to 40 cm, the air CA being emitted from the peripheral opening portions 7 toward to an obliquely-forward directions S of the air cleaner 4 may strike on both shoulders or both arms (upper arm) of the smoker or may pass through portions directly outside both the shoulders or both the arms.

In the above configuration, the air flows of cleaned air CA being emitted from the tabletop-type air cleaner 4 occur on both right and left sides of the air flow (air containing smoke of cigarette) DA being sucked into the tabletop-type air cleaner 4. Here, a flowing speed of the air flow DA being sucked into the air cleaner 4 is high in a central region of the flow and becomes the lower in a peripheral position of the flow, that is, in the region being the nearer to the emitted air flow of cleaned air CA that reverses a direction of the air flow DA. According to a law of hydrodynamics, smoke particles flowing through the peripheral region of the flow (low-speed flowing region) go toward the central region of the flow (high-speed flowing region) and therefore it is not easy for cigarette smoke to enter the emitted air flow of cleaned air CA. This phenomenon causes the emitted air flow of cleaned air CA to serve as an air curtain to intercept cigarette smoke and to push the cigarette smoke back to the central position. As a result, cigarette smoke is retracted, without excessive dispersion into surroundings, into the tabletop-type air cleaner 4 through the front opening portion 5. Thus, a personal use tabletop-type air cleaner 4 can be achieved which can be friendly to a human and can improve smoke sucking efficiency in a simple configuration.

Second Embodiment

Figure 8:
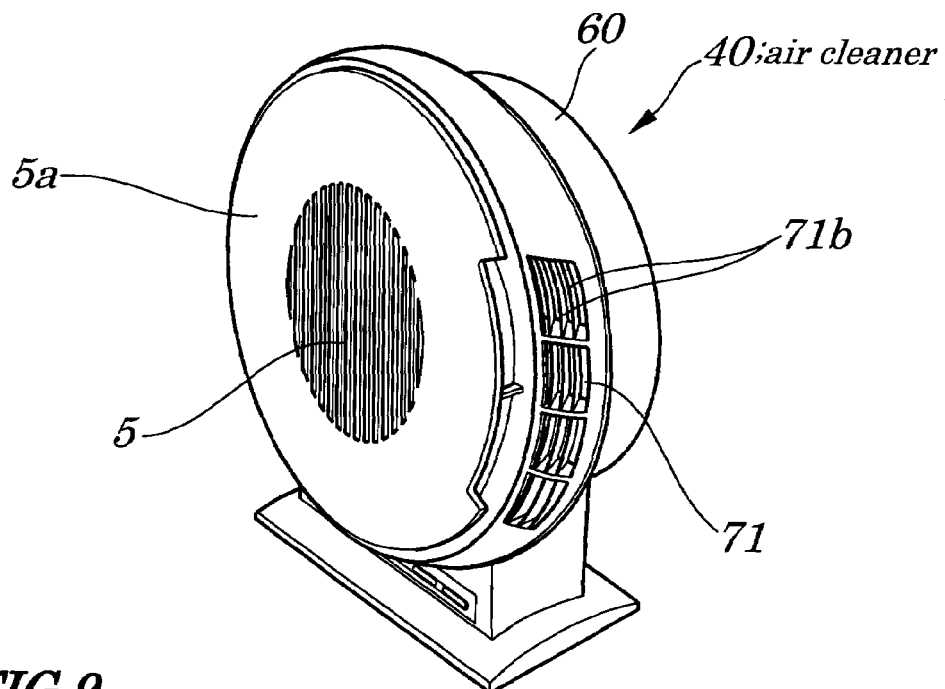
FIG. 8 is a perspective view schematically illustrating an appearance of configurations of a personal use tabletop-type air cleaner according to a second embodiment of the present invention.

FIG. 8 is a perspective view schematically illustrating an appearance of configurations of a personal use tabletop-type air cleaner 40 according to a second embodiment of the present invention. Unlike in the case of the first embodiment in which a plurality of blade plates (partitioning plate) 7b are arranged in a horizontal grid form in peripheral opening portions 7 to control a direction of an air flow being emitted, in the second embodiment, as shown in FIG. 8, a plurality of the blade plates (partitioning plates) 71b are arranged in a vertical grid form in the peripheral opening portions 71. By configuring as above, same effects obtained as in the first embodiment can be also obtained. Other parts of the air cleaner 40 are the same as those in the first embodiment, therefore description of them has been omitted.

Third Embodiment

Figure 9:
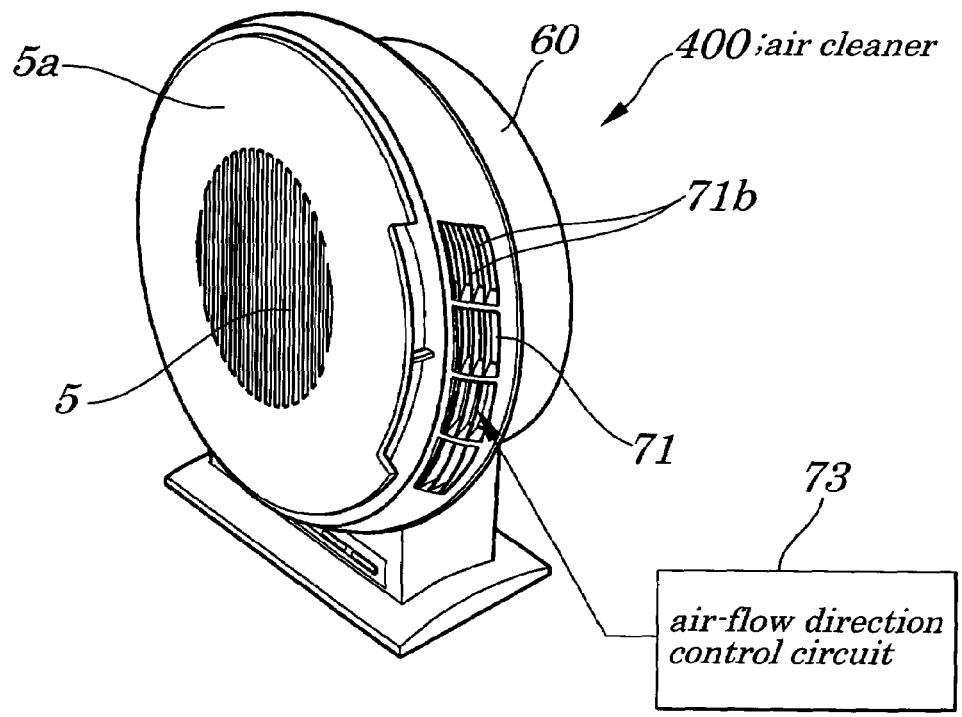
FIG. 9 is a perspective view schematically illustrating an appearance of configurations of a personal use tabletop-type air cleaner according to a third embodiment of the present invention.
Figure 10:
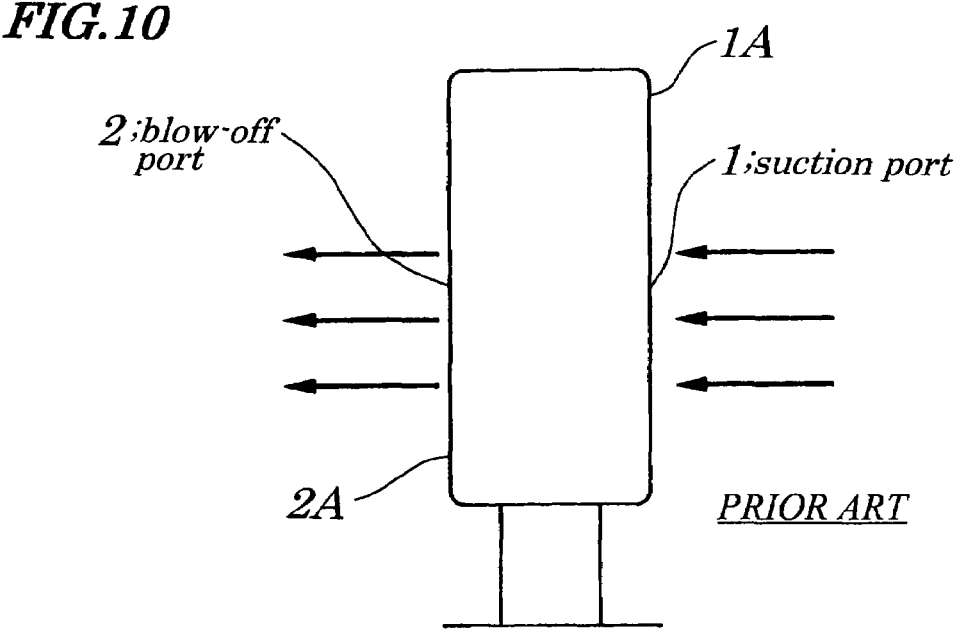
FIG. 10 is a side view schematically illustrating configurations of a conventional air cleaner.
Figure 11:
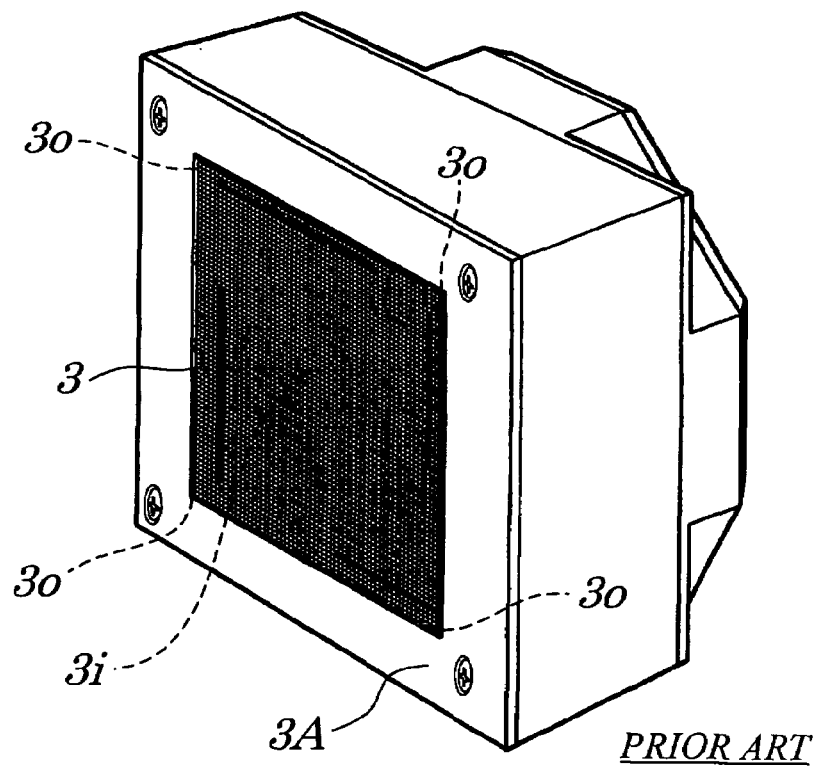
FIG. 11 is a perspective view schematically illustrating configurations of another conventional air cleaner.

FIG. 9 is a perspective view schematically illustrating an appearance of configurations of a personal use tabletop-type air cleaner 400 according to a third embodiment of the present invention. Unlike in the case of the second embodiment in which blade plates (partitioning plates) 71b are of a fixed-type plate type, in the third embodiment, as shown in FIG. 9, a plurality of blade plates (partitioning plates) 72b is placed in a manner so as to be rotatable in peripheral opening portions 72 and an air-flow direction control circuit 73 is mounted which is used to electrically control rotation of the blade plates (partitioning plates) 72b.

Thus, in the configurations of the third embodiment, since a direction of flowing of an emitted air CA can be changed according to a user's preference, further comfort feeling can be obtained.

Other parts of the air cleaner 400 with same reference numbers are basically the same as those of the first embodiment are the same as those in the first embodiment, and therefore their description of them has been omitted.

It is apparent that the present invention is not limited to the above embodiments but may be changed and modified without departing from the scope and spirit of the invention. For example, in the above embodiments, the dust collecting filter and the deodorizing filter that make a pair are mounted together, however, whenever necessary, only the dust collecting filter may be mounted or only the deodorizing filter may be mounted. Also, in the above embodiments, the dust collecting filter is placed between the front opening portion and the blower, however, the dust collecting filter may be placed between the blower and the peripheral opening portion. Similarly, the deodorizing filter may be mounted between the front opening portion and the blower.

Moreover, a human body sensor to detect a human causing operations of the air cleaner to be started or a smoke detecting sensor to detect smoke causing its operations to be started may be incorporated in the operation panel of the air cleaner of the present invention. Also, in the above embodiment, the peripheral opening portion is placed at a corner between the front and side of the air cleaner, however, the peripheral opening portion may be mounted only in portions surrounding the front of the air cleaner. Furthermore, in order to ensure dust collecting efficiency, an electrically-controlled dust collecting unit is mounted which can electrostatically collect dust by corona charging fine particles floating in air.

What is claimed is:

1. A tabletop-type air cleaner comprising:
   a front opening portion to suck air containing smoke, said front opening portion being placed at a front of the air cleaner;
   a blower to forcedly feed said air having been sucked from said front opening portion in a centrifugal direction;
   a pair of right and left peripheral opening portions to emit air fed forcedly from said blower ahead of the air cleaner, said pair of peripheral opening portions being placed in a fringe portion on the right and the left at said front of the air cleaner; and
   a dust collecting filter being placed at least one of between said front opening portion and said blower and between said blower and each of the peripheral opening portions making up said pair of right and left peripheral opening portions to remove the smoke,
   wherein said front opening portion is located between said right and left peripheral opening portions.

2. The tabletop-type air cleaner according to claim 1, further comprising a deodorizing filter being placed at least one of between said front opening portion and said blower and between said blower and each of said peripheral opening portions making up said pair of right and left peripheral opening portions.

3. The tabletop-type air cleaner according to claim 1, wherein said blower comprises a centrifugal-type blower having a blade wheel comprising a plurality of blades arranged in a ring-like form and said blower being mounted in a manner that a central axis of said blade wheel approximately conforms to a central axis of said front opening portion, wherein said blower, while being operated, captures air from a direction of said central axis of said blade wheel, provides the captured air with turn-around flows, and forcedly feeds, by using generated centrifugal force, air that turns around, from clearances among said blades toward a direction of a portion surrounding said blade wheel.

4. The tabletop-type air cleaner according to claim 1, wherein, between said front opening portion and said blower is placed a panel-shaped dust collecting filter which is operated in a form of a panel being folded up in a corrugated form.

5. The tabletop-type air cleaner according to claim 1, wherein a ring-shaped dust collecting filter is placed between said blower and each of said peripheral opening portions making up said pair of right and left peripheral opening portions and on a side of said portions surrounding a blade wheel of the blower in such a manner that a central axis of said dust collecting filter conforms to said central axis of said blade wheel.

6. The tabletop-type air cleaner according to claim 2, wherein a ring-shaped deodorizing filter is placed between said blower and each of said peripheral opening portions making up said pair of right and left peripheral opening portions and on said side of said portions surrounding a blade wheel of the blower in such a manner that a central axis of said deodorizing filter conforms to said central axis of said blade wheel.

7. The tabletop-type air cleaner according to claim 1, wherein the air fed forcedly from said blower is emitted toward an obliquely-forward direction of the air cleaner from said pair of right and left peripheral opening portions in a manner that said air is separated right and left.

8. The tabletop-type air cleaner according to claim 7, wherein each of said peripheral opening portions making up said pair of right and left peripheral opening portions is placed at a corner between a front and a side of the air cleaner.

9. The tabletop-type air cleaner according to claim 7, wherein each of said peripheral opening portions is formed so as to be approximately longitudinally long along a fringe of a front of the air cleaner.

10. The tabletop-type air cleaner according to claim 1, wherein said pair of right and left peripheral opening portions are displaced apart from each other in a horizontal direction a distance in a range of about 25 cm to about 40 cm.

11. The tabletop-type air cleaner according to claim 1, wherein each of said peripheral opening portions has a plurality of blade plates which give a directional property to the air being emitted.

12. The tabletop-type air cleaner according to claim 11, wherein said blade plates are attached so as to be rotatable so that a direction of the air being emitted is changed.

13. The tabletop-type air cleaner according to claim 12, wherein an air-flow direction control circuit is mounted which is used to electrically control rotation of said blade plates.

14. The tabletop-type air cleaner according to claim 1, wherein an electrically-controlled dust collecting unit is mounted which is used to electrostatically collect dust by corona charging fine particles floating in the air.

15. The tabletop-type air cleaner according to claim 1, wherein said dust collecting filter comprises at least one of a porous material and a fibrous material.

* * * * *